Feb. 3, 1948. V. C. PATTERSON 2,435,462
FOOD FREEZING APPARATUS
Filed Feb. 27, 1946
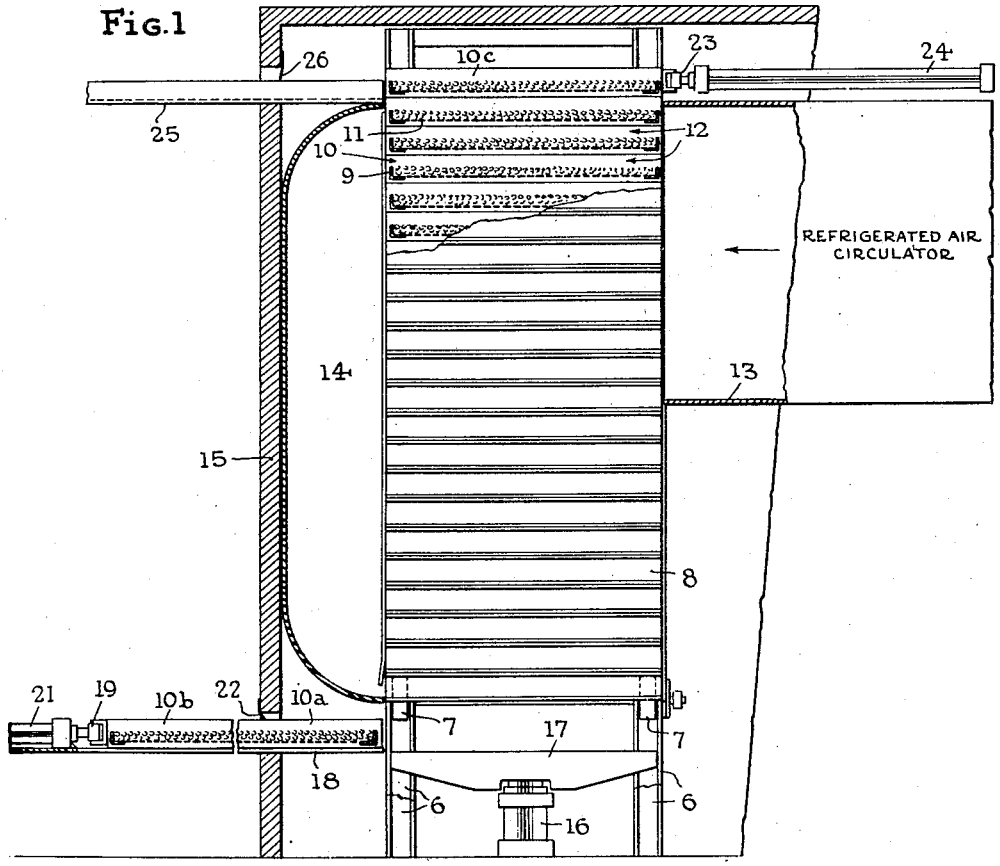
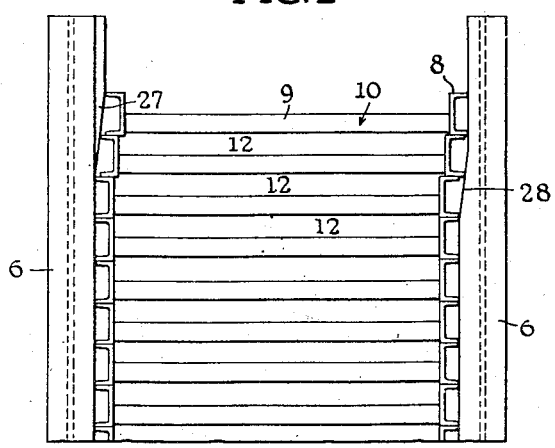
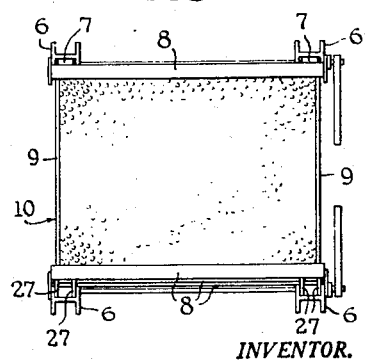
INVENTOR.
Velt C. Patterson
BY
Attorneys Patented Feb. 3, 1948

2,435,462

UNITED STATES PATENT OFFICE 2,435,462

FOOD FREEZING APPARATUS

Velt C. Patterson, York, Pa., assignor to York Corporation, York, Pa., a corporation of Delaware Application February 27, 1946, Serial No. 650,421

4 Claims. (Cl. 62—102)

This invention relates to machines for freezing food products such as vegetables, fish and meat either in bulk or in packages, as occasion may require.

In my prior application Serial No. 566,313, filed December 2, 1944, since abandoned in favor of a continuing application Serial No. 657,001, filed March 25, 1946, there is described and claimed a machine in which the articles to be frozen are placed in trays which are inserted at the bottom and removed from the top of an intermittently rising stack. The trays rest upon one another, and are moved upward by a reciprocating lift which acts upon the lowermost tray in the stack and pushes the stack up until the bottom tray latches in an elevated position. Then the lift retreats to admit the next tray. The trays are pushed beneath the stack by a conveyor, while the lift is lowered, and trays with their contents frozen are slid off the top of the stack by a similar conveyor. In practice, the two conveyors act at the same time, and in the interval between upward excursions of the lift.

Similar results could be secured by feeding the trays to the top and removing them from the bottom of a downward-moving stack, but the described arrangement is simpler and better suited to the average installation. The possibility of reversing the arrangement is recognized.

The trays are so formed as to provide transverse air ducts through the stack. Freezing is effected by blowing refrigerated air through these ducts in one or more passes.

Many vegetables which are to be frozen in bulk must be fed to the trays in a wet condition resulting from prior processing steps such as blanching, washing and the like. As a consequence, the marginal frames of the trays become wet so that the trays tend to freeze together in the stack. Since the trays are four feet square or larger it then requires considerable force to slide the top tray off the stack. For this reason, the motor which drives the discharging conveyor in my prior application had to be large enough to develop the necessary force and was much larger than necessary for its ensuing conveying action.

The reciprocating lift which raises the stack of trays is necessarily very powerful, so that the force necessary to free frozen trays is only a small percentage of the force developed by the lift. The present invention has the effect of transferring the tray freeing function from the discharge conveyor to the lift.

This is accomplished by providing in the tower adjacent the tray discharge station, means adapted to develop on the topmost tray or trays a laterally acting force, derived from the upward movement of the stack of trays, and sufficient to shear the top tray or trays from the stack. The simplest way of doing so is to incline the guiding portions of the tower near the top thereof so that as the trays approach the discharge station they will be forced laterally and thus break any frozen bond between the trays.

In order to intensify the force developed it s desirable that the inclination of the displacing guides be low. For this reason, and to be sure that the trays are positively deflected sufficiently to free them, it is convenient to arrange the deflecting guides so that they affect more than one tray. It is sufficient, however, if the guides act to deflect the topmost tray in its final approach to that level at which the discharging conveyor acts. The invention is particularly suited to use with an upward moving stack, because the top trays are lightly loaded, but the invention can be adapted to a downward-moving stack.

The invention will now be described by reference to the accompanying drawing in which:

Fig. 1 is an elevation of the stack together with the lift, the charging and discharging conveyors and a portion of the means for circulating refrigerated air. In this view certain parts are sectioned to make the construction clear.

Fig. 2 is a view in elevation of the upper portion of the stack as viewed from the right-hand side with reference to Fig. 1. This view shows how the trays are shifted by the inclined guide.

Fig. 3 is a top view of the stack shown in Fig. 1.

Referring particularly to Fig. 1, the tower is composed of four H-section columns 6 of steel. Each column carries pivoted to it a gravity-actuated tray engaging latch 7. The trays, generally designated by the numeral 10, are approximately square with sides 8 of channel iron and ends 9 of lower height which, in practice, are made of angle iron. The bottom 11 of the tray is of screen material.

The trays are stacked with their channel iron sides 8 in contact. Since the ends 9 are lower and since the trays are filled only to the level of the tops of the ends 9 (see the upper trays in Fig. 1) there is an air passage 12 through the stack above the material in each tray.

Refrigerated air delivered through a duct 13 from a fan (not shown) is blown through the passages 12 in the upper half of the stack, is collected and led downward by duct 14 and returns through the passages 12 in the lower half of the stack. The parts so far described are enclosed in an insulated housing 15, and air discharging from the second pass through the stack simply flows within housing 15 to the refrigerating coils and the fan and thence to duct 13. The refrigerating apparatus and fan are of any suitable type and hence have been omitted from the drawing.

At the bottom of the tower is a hydraulic lift cylinder 16 adapted to raise and lower a platen 17 between the lower position shown in Fig. 1 and an upper position in which its top is slightly above the level of the bottom of the lowermost tray in Fig. 1.

A trackway 18 alines with platen 17 when the latter is lowered and serves to guide a tray 10a onto the platen. The tray 10a is pushed on by an injector plunger 19 actuated by a motor cylinder 21. This plunger 19 acts on the rear one of a series of trays 10a, 10b. This detail is of no present importance, but the break at the left of tray 10a is intended to suggest the possibility. The entering trays, such as 10a, pass through an opening in housing 15 protected by flap valve 22.

At the same time a tray 10a is fed to platen 17 the top tray 10c is pushed off the stack by an ejector plunger 23 actuated by a motor cylinder 24. The tray is ejected to a trackway 25 through an aperture in housing 15 which is protected by a flap valve 26.

After the plungers 19 and 23 have advanced and retreated the lift 15 is raised and lowered. It thus lifts the newly introduced tray 10a against the bottom of the stack, then lifts it and the stack until latches 7 engage the upper flange of the newly introduced tray and then retreats.

The controlling apparatus used to time the operation of the motors 21 and 24 and lift 16 is not here material, need not be described and is not illustrated.

The mechanism so far discussed is functionally identical with that disclosed in my prior application.

To permit the use of a small motor 24, it is desirable to assure that the topmost tray 10c is freed from the next lower tray, to which it may have frozen while rising through the tower.

To effect this, inclined deflecting guide members 27 are applied to two of the columns 6 while the opposite two columns are appropriately cut away as indicated at 28. Because the trays which engage members 27 have substantial depth, the opposed inclines at 27, 28 are vertically offset as shown in Fig. 2.

The effect is to apply part of the force developed by lift 16 to the work of freeing the trays. Since this is only a small part of the load imposed on lift 16, the work is done gradually and economically, as compared to the use of a motor 24 large enough to break away a frozen tray. A large motor in place of motor 24 would consume excess energy over its entire stroke to overcome a resistance which would be small except at the start.

The invention thus offers a very simple and inexpensive safeguard against the troublesome effects of freeze-ups. Any deflector which would cause upward motion of a tray approaching the discharge station to ensure a lateral displacement of the tray sufficient to break it free of the next lower tray will serve the purpose. Modifications within the scope of the claims are consequently contemplated.

What is claimed is:

1. The combination of a guiding tower; a plurality of trays adapted to be advanced through said tower in a stack, conveyor means for withdrawing trays successively from the stack at the discharge end thereof; refrigerative means effective in the tower to chill the trays and their contents to sub-freezing temperatures; power means for advancing the stack of trays through the tower; and deflecting means adapted to engage successive trays as they approach the discharge end of the stack, and cause them to move laterally relatively to the stack as an incident to the feeding motion of the stack.

2. The combination defined in claim 1 in which the stack of trays is forced vertically upward through the tower and the trays are discharged by the conveyor at the top of the stack, whereby the deflecting means acts on trays while the trays are comparatively lightly loaded.

3. The combination of a guiding tower; a plurality of trays adapted to be lifted step by step in a stack through said tower, said trays each having latch engaging projections; latches mounted near the bottom of the tower and adapted to engage the projections on the lowermost tray of the stack, means for inserting trays serially beneath the bottom of the stack, means for withdrawing trays serially from the top of the stack; means for circulating refrigerated air through the stacked trays, a reciprocating lift mounted at the base of the tower beneath the stack, said lift being adapted to engage the inserted tray and lift it and the stack until the latches engage the inserted tray, and then retreat to admit the next inserted tray, and oblique guides mounted at the top of the tower in position to engage at least the topmost tray and move it laterally relatively to the stack of trays to free the tray preparatory to the action of said tray withdrawing means.

4. The combination of a guiding tower; a plurality of trays adapted to be advanced through said tower in a stack, conveyor means for withdrawing trays successively from the stack at the discharge end thereof; refrigerative means effective in the tower to chill the trays and their contents to sub-freezing temperatures; power means for advancing the stack of trays through the tower; and means adapted to function as an incident to vertical motion of the tray stack and serving to produce relative motion between two adjacent trays near the discharge end of the stack, such motion being sufficient in extent to rupture any ice bond which may exist between said trays.

VELT C. PATTERSON.